US012525188B2

(12) United States Patent
Pyo

(10) Patent No.: US 12,525,188 B2
(45) Date of Patent: Jan. 13, 2026

(54) METHOD FOR SETTING BLACK VOLTAGE IN A DISPLAY DEVICE AND DRIVING METHOD FOR A DISPLAY DEVICE PERFORMING THE SAME

(71) Applicant: SAMSUNG DISPLAY CO., LTD., Yongin-si (KR)

(72) Inventor: Si Beak Pyo, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/944,124

(22) Filed: Nov. 12, 2024

(65) Prior Publication Data

US 2025/0391354 A1 Dec. 25, 2025

(30) Foreign Application Priority Data

Jun. 20, 2024 (KR) ........................ 10-2024-0080148
Jul. 5, 2024 (KR) ........................ 10-2024-0089065

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2320/0238* (2013.01); *G09G 2360/145* (2013.01)

(58) Field of Classification Search
CPC ......... G09G 3/3233; G09G 2300/0819; G09G 2300/0842; G09G 2320/0238; G09G 2360/145
See application file for complete search history.

(56) References Cited

U.S. PATENT DOCUMENTS

| | | | | |
|---|---|---|---|---|
| 10,878,777 | B2 | 12/2020 | Hwang et al. | |
| 10,997,909 | B2 * | 5/2021 | Pyo | G09G 3/3233 |
| 11,138,936 | B2 * | 10/2021 | Kim | G09G 3/006 |
| 11,804,173 | B1 | 10/2023 | Pyo | |
| 2017/0076695 | A1 * | 3/2017 | Hwang | G09G 3/3291 |

FOREIGN PATENT DOCUMENTS

| | | | |
|---|---|---|---|
| KR | 10-2537993 | B1 | 6/2023 |
| KR | 10-2556467 | B1 | 7/2023 |

* cited by examiner

*Primary Examiner* — David Tung
(74) *Attorney, Agent, or Firm* — F. CHAU & ASSOCIATES, LLC

(57) ABSTRACT

A method for setting a black voltage in a display device, including: determining a first maximum black voltage through simulation of a pixel in a display panel; determining a second maximum black voltage that is less than the first maximum black voltage; determining a bias voltage based on the second maximum black voltage; measuring luminance of the display panel by applying a preliminary black voltage and the bias voltage to the pixel; increasing the preliminary black voltage until the luminance becomes lower than a reference luminance; and when the luminance is lower than the reference luminance, determining a black voltage based on the preliminary black voltage.

20 Claims, 8 Drawing Sheets

METHOD FOR SETTING BLACK VOLTAGE IN A DISPLAY DEVICE AND DRIVING METHOD FOR A DISPLAY DEVICE PERFORMING THE SAME

CROSS-REFERENCE TO RELATED APPLICATIONS

This application claims priority under 35 U.S.C. § 119 to Korean Patent Application No. 10-2024-0080148 filed in the Korean Intellectual Property Office on Jun. 20, 2024, and Korean Patent Application No. 10-2024-0089065 filed in the Korean Intellectual Property Office on Jul. 5, 2024 the disclosures of which are incorporated by reference herein in their entireties.

TECHNICAL FIELD

The present disclosure relates to a method for setting a black voltage in a display device and a driving method for a display device performing the same.

DESCRIPTION OF THE RELATED ART

A typical display device includes a display panel, a gate driver, a data driver, and a driving controller. The display panel includes a plurality of gate lines, a plurality of data lines, and a plurality of pixels electrically connected to the plurality of gate lines and the plurality of data lines. The gate driver provides gate signals to the gate lines, the data driver provides data voltages to the data lines, and the driving controller controls the operation of the gate driver and the data driver.

Each display panel may produce varying luminance levels for the same data voltage due to manufacturing differences. Therefore, it is necessary to set a specific black voltage for each display panel.

SUMMARY OF THE INVENTION

An embodiment of the present disclosure provides a method for setting the black voltage in a display device.

Another embodiment of the present disclosure provides a method for driving a display device that implements the black voltage setting method.

An embodiment of the present disclosure provides a method for setting a black voltage in a display device, including: determining a first maximum black voltage through simulation of a pixel in a display panel; determining a second maximum black voltage that is less than the first maximum black voltage; determining a bias voltage based on the second maximum black voltage; measuring luminance of the display panel by applying a preliminary black voltage and the bias voltage to the pixel; increasing the preliminary black voltage until the luminance becomes lower than a reference luminance; and when the luminance is lower than the reference luminance, determining a black voltage based on the preliminary black voltage.

The first maximum black voltage is a minimum data voltage at which a current flowing through a driving transistor of the pixel in the simulation is lower than a reference current.

The second maximum black voltage is a maximum voltage among black voltages of non-defective display devices.

The bias voltage is obtained by adding a preset offset voltage to the second maximum black voltage.

An initial value of the preliminary black voltage is less than the second maximum black voltage.

The increasing of the preliminary black voltage further includes: increasing the preliminary black voltage when the preliminary black voltage is less than the second maximum black voltage; recalculating the bias voltage based on the preliminary black voltage when the preliminary black voltage is greater than or equal to the second maximum black voltage; and increasing the preliminary black voltage when the preliminary black voltage is greater than or equal to the second maximum black voltage and less than the first maximum black voltage.

Increasing of the preliminary black voltage further includes: determining the display device to be defective when the preliminary black voltage is greater than or equal to the first maximum black voltage.

The black voltage is determined by adding a preset margin voltage to the preliminary black voltage.

The pixel includes: a first transistor for generating a driving current; a second transistor for providing a data voltage to the first transistor in response to a write gate signal; a third transistor for diode-connecting the first transistor in response to a compensation gate signal; a storage capacitor connected to a control electrode of the first transistor; and a light emitting element electrically connected to the first transistor.

The first transistor is a p-channel metal oxide semiconductor (PMOS) transistor.

An embodiment of the present disclosure provides a method for driving a display device, including: determining a reference power voltage; determining a black voltage; and determining grayscale voltages based on the black voltage, wherein the determining of the black voltage includes: determining a first maximum black voltage through simulation of a pixel in a display panel; determining a second maximum black voltage that is less than the first maximum black voltage; determining a bias voltage based on the second maximum black voltage; measuring luminance of the display panel by applying a preliminary black voltage, the bias voltage, and the reference power voltage to the pixel; increasing the preliminary black voltage until the luminance becomes lower than a reference luminance; and when the luminance is lower than the reference luminance, determining a black voltage based on the preliminary black voltage.

The first maximum black voltage is a minimum data voltage that allows a current flowing through a driving transistor of the pixel in the simulation to be lower than a reference current.

The second maximum black voltage is a maximum voltage among black voltages of non-defective display devices.

The bias voltage is obtained by adding a preset offset voltage to the second maximum black voltage.

An initial value of the preliminary black voltage is less than the second maximum black voltage.

The increasing of the preliminary black voltage further includes: increasing the preliminary black voltage when the preliminary black voltage is less than the second maximum black voltage; recalculating the bias voltage based on the preliminary black voltage when the preliminary black voltage is greater than or equal to the second maximum black voltage; and increasing the preliminary black voltage when the preliminary black voltage is greater than or equal to the second maximum black voltage and less than the first maximum black voltage.

The increasing of the preliminary black voltage further includes: determining the display device to be defective when the preliminary black voltage is greater than or equal to the first maximum black voltage.

The black voltage is determined by adding a preset margin voltage to the preliminary black voltage.

The pixel includes: a first transistor for generating a driving current; a second transistor for providing a data voltage to the first transistor in response to a write gate signal; a third transistor for diode-connecting the first transistor in response to a compensation gate signal; a storage capacitor connected to a control electrode of the first transistor; and a light emitting element electrically connected to the first transistor.

The driving transistor is a PMOS transistor.

According to the embodiments of the present disclosure, the method for setting the black voltage of the display device may set a lower black voltage by using a second maximum black voltage, which is smaller than a first maximum black voltage determined through simulation.

Accordingly, power consumption of the display device may be reduced. In addition, by decreasing the difference between the data voltage of the highest grayscale and the data voltage of the lowest grayscale (i.e., the black voltage), the impact of data voltage swings on other components, such the touch electrode of a touch panel disposed on the display panel, can be minimized.

DETAILED DESCRIPTION OF THE EMBODIMENTS

Figure 1:
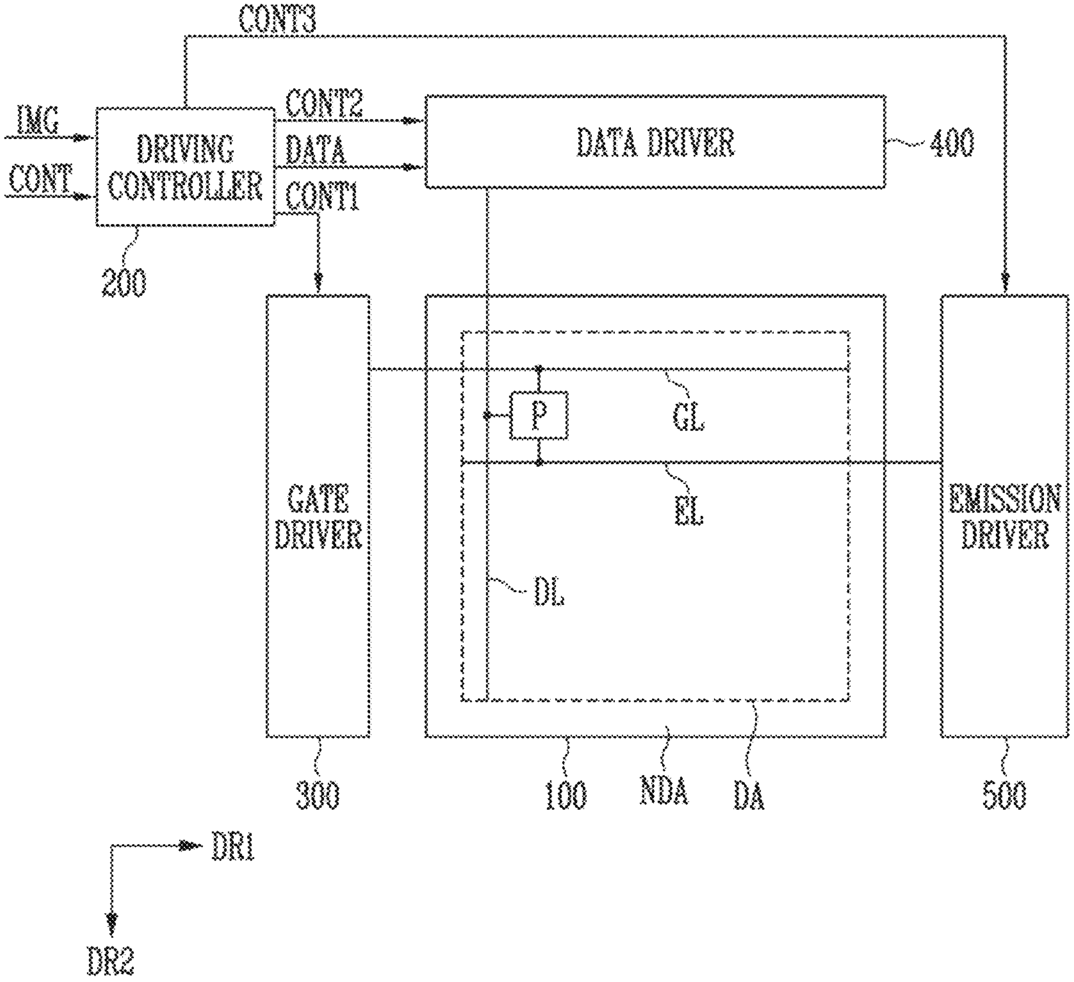
FIG. 1 illustrates a block diagram of a display device according to embodiments of the present disclosure.

Hereinafter, example embodiments of the present disclosure will be described in detail with reference to the accompanying drawings. The following description is intended to provide sufficient detail to enable an understanding of the operation of the invention, with any unnecessary details omitted to avoid obscuring its scope. In addition, the invention may be embodied in different forms and is not limited to the embodiments set forth herein. The embodiments described herein are provided to explain the technical concept of the invention in enough detail for those skilled in the art to readily implement it.

In this specification, when an element is described as being "connected" to another element, it includes both "directly connected", and "indirectly connected" with an intervening device. The terms used herein are for describing specific embodiments and are not intended to limit the scope of the invention. Unless otherwise explicitly stated, the term "comprise" and its variations such as "comprises" or "comprising" are understood to indicate the inclusion of stated elements without excluding other elements. Additionally, the phrases "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. The term "and/or" as used herein includes any and all combinations of one or more of the associated listed items.

Although the terms first, second, etc. may be used herein to describe various constituent elements, these constituent elements should not be limited by these terms. These terms are used to distinguish one constituent element from another. Thus, a first constituent element discussed below could be termed a second constituent element.

Spatially relative terms such as "beneath," "below," "lower," "above," "upper," and the like, are used for descriptive purposes to indicate the relationship between one element or feature and another as illustrated in the drawings. These terms are intended to cover different orientations of an apparatus in use, operation, and/or manufacture, in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, if the apparatus is rotated (for example, by 90 degrees or to another position), the spatially relative descriptors should be interpreted accordingly.

Various embodiments are described herein with reference to sectional illustrations that depict idealized versions of the embodiments. Variations in the shapes of these illustrations, due to manufacturing techniques and/or tolerances, are to be expected. Thus, the example embodiments should not be construed as limited to the specific shapes shown, but should include deviations that result from manufacturing processes. The regions illustrated in the drawings are schematic in nature and are not intended to represent the actual shapes of regions in a device or to be limiting in any way.

FIG. 1 illustrates a block diagram of a display device according to embodiments of the present disclosure.

Referring to FIG. 1, the display device may include a display panel 100, a driving controller 200, a gate driver 300, a data driver 400, and an emission driver 500. In the embodiment, the driving controller 200 and data driver 400 may be integrated on a single chip.

The display panel 100 may include a display area DA for displaying an image and a non-display area NDA disposed adjacent to the display area DA. In the embodiment, the gate driver 300 and the emission driver 500 may be mounted in the non-display area NDA.

The display panel 100 may include a plurality of pixels P electrically connected to a plurality of gate lines GL, a plurality of data lines DL, and a plurality of emission lines EL. The gate lines GL and the emission lines EL may be extended in a first direction DR1, and the data lines DL may be extended in a second direction DR2 intersecting the first direction DR1. The driving controller 200 may receive input image data IMG and an input control signal CONT from a main processor (for example, a graphic processing unit (GPU) and the like). For example, the input image data IMG may include red image data, green image data, and blue image data. In the embodiment, the input image data IMG may further include white image data. As another example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 to control the operation of the gate driver 300, based on the input control signal CONT, and then send it to the gate driver 300. The first control signal CONT1 may include a vertical start signal and a gate clock signal.

The driving controller 200 may generate the second control signal CONT2 to control the operation of the data driver 400, based on the input control signal CONT, and then send it to the data driver 400. The second control signal CONT2 may include a horizontal start signal and a load signal.

The driving controller 200 may receive the input image data IMG and the input control signal CONT to generate the data signal DATA. The driving controller 200 may output the data signal DATA to the data driver 400.

The driving controller 200 may generate the third control signal CONT3 to control the operation of the emission driver 500, based on the input control signal CONT, and then send it to the emission driver 500. The third control signal CONT3 may include a vertical start signal and an emission clock signal.

The gate driver 300 may generate gate signals to drive the gate lines GL in response to the first control signal CONT1 received from the driving controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the driving controller 200. The data driver 400 may generate data voltages obtained by converting the data signal DATA into an analog voltage. The data driver 400 may output the data voltages to the data line DL.

The emission driver 500 may generate emission signals to drive the emission lines EL in response to the third control signal CONT3 received from the driving controller 200. The emission driver 500 may output the emission signals to the emission lines EL. For example, the emission driver 500 may sequentially output the emission signals to the emission lines EL.

Figure 2:
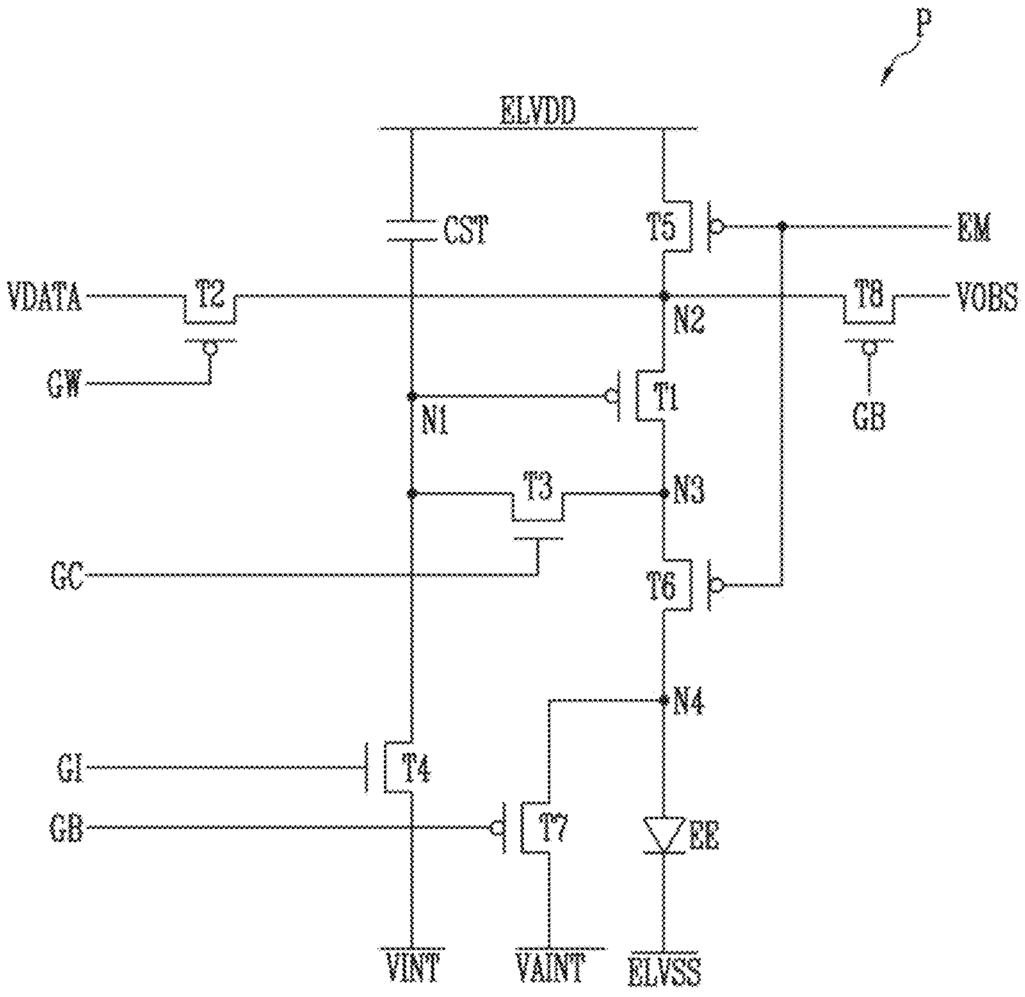
FIG. 2 illustrates a circuit diagram of a pixel of the display device of FIG. 1.

FIG. 2 illustrates a circuit diagram of a pixel of the display device of FIG. 1.

Referring to FIG. 2, each of the pixels P may include a first transistor T1 (e.g., a driving transistor) for generating a driving current, a second transistor T2 for providing a data voltage VDATA to the first transistor T1 in response to a write gate signal GW, a third transistor T3 for diode-connecting the first transistor T1 in response to a compensation gate signal GC, a storage capacitor CST connected to a control electrode (e.g., a gate electrode) of the first transistor T1, and a light emitting element EE electrically connected to the first transistor T1.

For example, each of the pixels P may include the first transistor T1 (e.g., the driving transistor) including a control electrode connected to a first node N1, a first electrode connected to a second node N2, and a second electrode connected to a third node N3; the second transistor T2 including a control electrode for receiving the write gate signal GW, a first electrode for receiving the data voltage VDATA, and a second electrode connected to the second node N2; and the third transistor T3 including a control electrode for receiving the compensation gate signal GC, a first electrode connected to the third node N3, and a second electrode connected to the first node N1. Each of the pixels P may further include a fourth transistor T4 including a control electrode for receiving an initialization gate signal GI, a first electrode for receiving a first initialization voltage VINT, and a second electrode connected to the first node N1; a fifth transistor T5 including a control electrode for receiving an emission signal EM, a first electrode for receiving a driving power voltage ELVDD (e.g., a high power voltage), and a second electrode connected to the second node N2; and a sixth transistor T6 including a control electrode for receiving the emission signal EM, a first electrode connected to the third node N3, and a second electrode connected to a fourth node N4. Each of the pixels P may further include a seventh transistor T7 including a control electrode for receiving a bias gate signal GB, a first electrode for receiving a second initialization voltage VAINT, and a second electrode connected to the fourth node N4; an eighth transistor T8 including a control electrode for receiving the bias gate signal GB, a first electrode for receiving a bias voltage VOBS, and a second electrode connected to the second node N2; the storage capacitor CST including a first electrode for receiving the driving power voltage ELVDD and a second electrode connected to the first node N1; and the light emitting element EE including a first electrode (e.g., an anode electrode) connected to the fourth node N4 and a second electrode for receiving a reference power voltage ELVSS (e.g., a low power voltage). However, the present disclosure is not limited to the structure of the pixel P.

Hereinafter, it is assumed that the third and fourth transistors T3 and T4 are implemented as n-channel metal oxide semiconductors (NMOS) transistors, and the first, second, and fifth to eighth transistors T1, T2, and T5 to T8 are implemented as p-channel metal oxide semiconductors (PMOS) transistors. For example, the third and fourth transistors T3 and T4 may be N-type oxide thin film transistors, and the first, second, and fifth to eighth transistors T1, T2, and T5 to T8 may be P-type silicon thin film transistors. In another embodiment, at least some of the third and fourth transistors T3 and T4 may be PMOS transistors, or at least some of the first, second, and fifth to eighth transistors T1, T2, and T5 to T8 may be NMOS transistors.

The oxide thin film transistor may be a low temperature polycrystalline oxide (LTPO) thin film transistor in which an active pattern (e.g., semiconductor layer) includes an oxide. However, this is only an example, and the N-type transistors are not limited thereto. For example, the active pattern (e.g., semiconductor layer) included in the N-type transistor may include an inorganic semiconductor (e.g., amorphous silicon or polysilicon) or an organic semiconductor. The silicon thin film transistor may be a low temperature poly-silicon (LTPS) thin film transistor in which an active pattern (e.g., semiconductor layer) includes amorphous silicon and poly silicon.

In the case of the NMOS transistor, the low voltage level may be an inactivation level, and the high voltage level may be an activation level. For example, when a signal applied to the control electrode of the NMOS transistor has a low voltage level, the NMOS transistor may be turned off. For example, when a signal applied to the control electrode of the NMOS transistor has a high voltage level, the NMOS transistor may be turned on. In the case of the PMOS transistor, the low voltage level may be an activation level, and the high voltage level may be an inactivation level. For example, when a signal applied to the control electrode of the PMOS transistor has a low voltage level, the PMOS transistor may be turned on. For example, when a signal applied to the control electrode of the PMOS transistor has a high voltage level, the PMOS transistor may be turned off. In other words, the activation and inactivation levels may be determined based on the type of transistor.

For example, in an initialization period, the initialization gate signal GI may have an activation level, turning on the fourth transistor T4. Accordingly, the first initialization voltage VINT may be applied to the first node N1, performing a gate initialization operation. In other words, the control electrode, which is, the storage capacitor CST, of the first transistor T1 may be initialized.

For example, in a data write period, the write gate signal GW and the compensation gate signal GC may have an activation level, turning on the second transistor T2 and the third transistor T3. Accordingly, the data voltage VDATA may be written to the storage capacitor CST.

For example, in an anode initialization period, the bias gate signal GB has an activation level, turning on the seventh transistor T7 and the eighth transistor T8. Accordingly, the second initialization voltage VAINT, also referred to as the anode initialization voltage, may be applied to the first electrode (e.g., the anode electrode) of the light emitting element EE, and the bias voltage VOBS may be applied to the first electrode of the first transistor T1.

For example, in a light emitting period, the emission signal EM may have an activation level, turning on the fifth transistor T5 and the sixth transistor T6. Accordingly, the driving power voltage ELVDD is applied to the first transistor T1 to generate a driving current, which is then applied to the light emitting element EE. In this way, the light emitting element EE emits light with luminance corresponding to the driving current.

Figure 3:
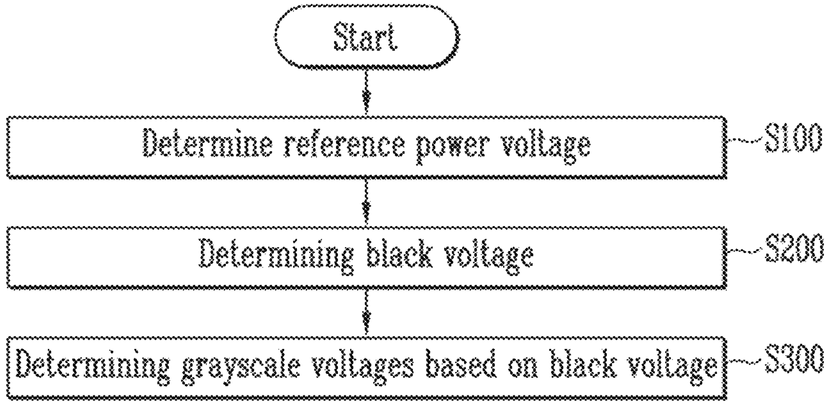
FIG. 3 illustrates a flowchart of a method of driving a display device according to embodiments of the present disclosure.

FIG. 3 illustrates a flowchart of a method of driving a display device according to embodiments of the present disclosure.

Referring to FIG. 3, the method of driving the display device may include determining a reference power voltage ELVSS (see FIG. 2) (S100), determining a black voltage (S200), and determining grayscale voltages based on the black voltage (S300).

In step S200, the luminance of the pixel P (see FIG. 2) is measured. For this luminance measurement, the reference power voltage ELVSS applied to the pixel P, as shown in FIG. 2, may be the voltage determined in step S100.

The black voltage refers to the data voltage VDATA at the lowest grayscale, as shown in FIG. 2. For example, the data voltage of 0 grayscale can be considered the black voltage.

Gray voltages correspond to the data voltages for each grayscale. The grayscale voltages, excluding the lowest grayscale, are determined based on the black voltage. For example, once the black voltage is determined, the grayscale voltages (excluding the lowest grayscale) are established as values lower than the black voltage. In other words, the grayscale voltages are determined with a specific gamma value based on the black voltage.

Figure 4:
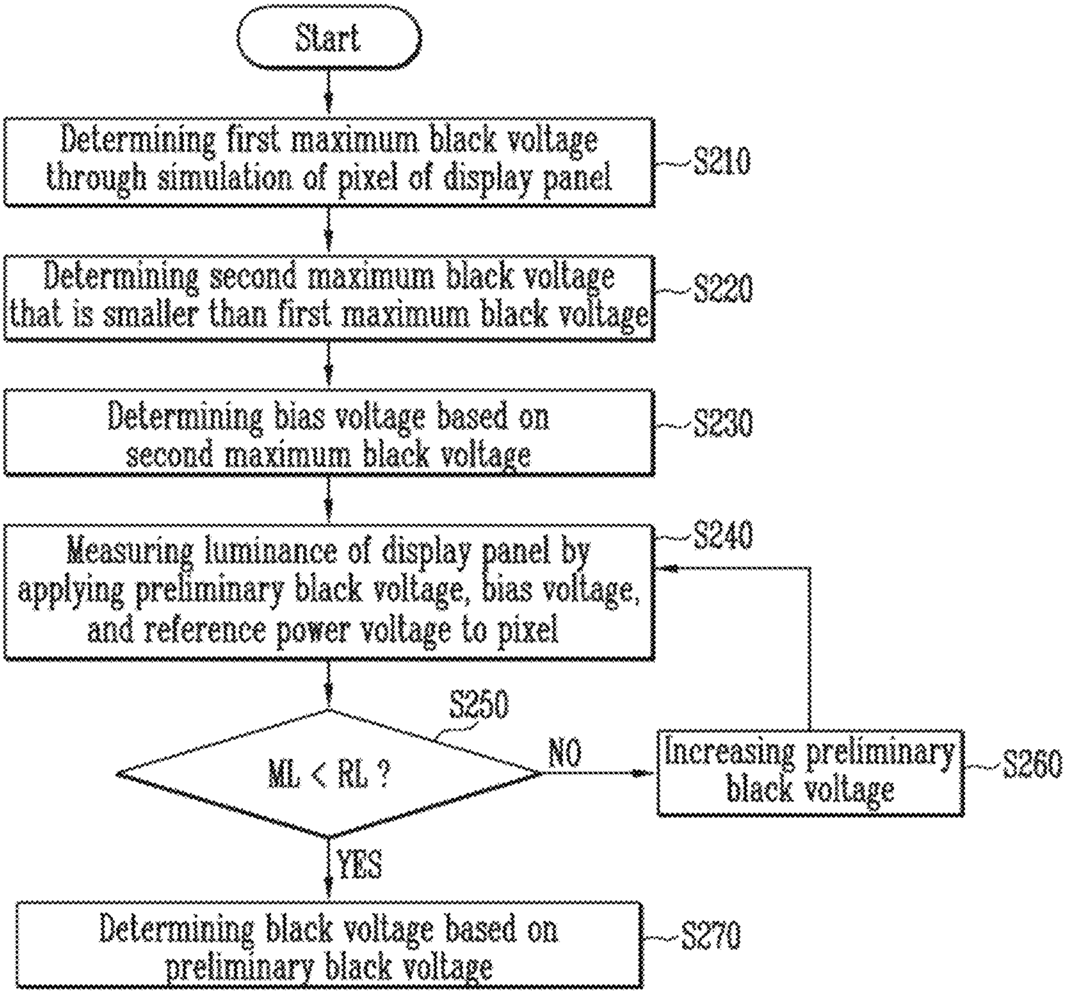
FIG. 4 illustrates a flowchart of step S200 of FIG. 3.
Figure 5:
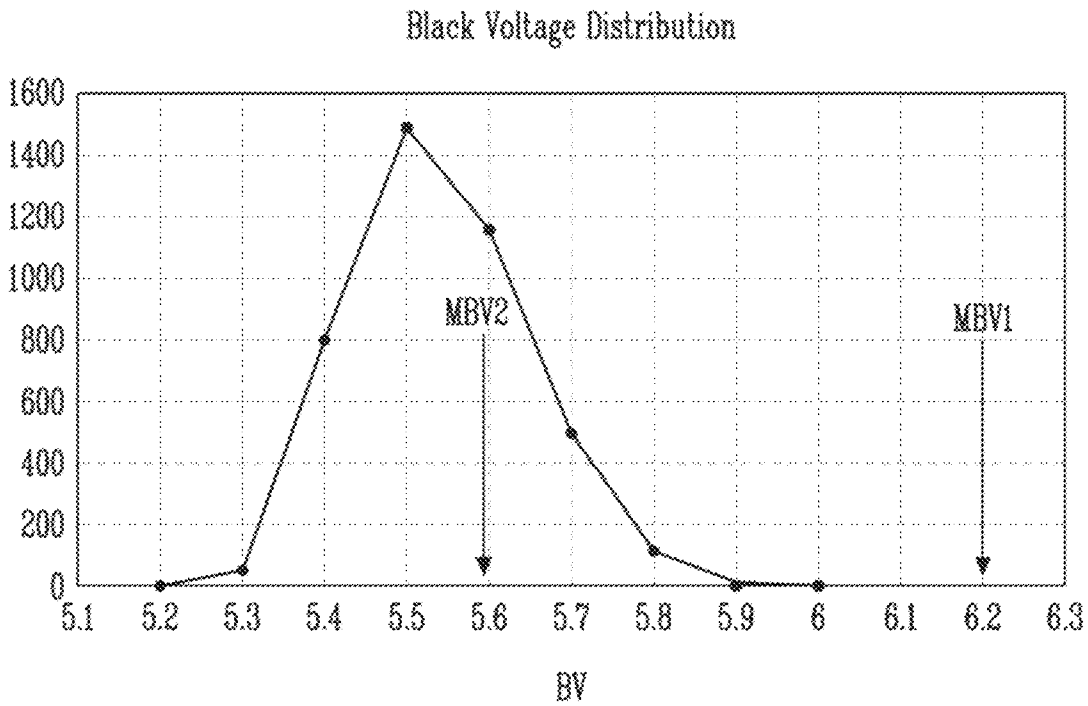
FIG. 5 illustrates a graph of determining a second maximum black voltage in step S220 of FIG. 4.
Figure 6:
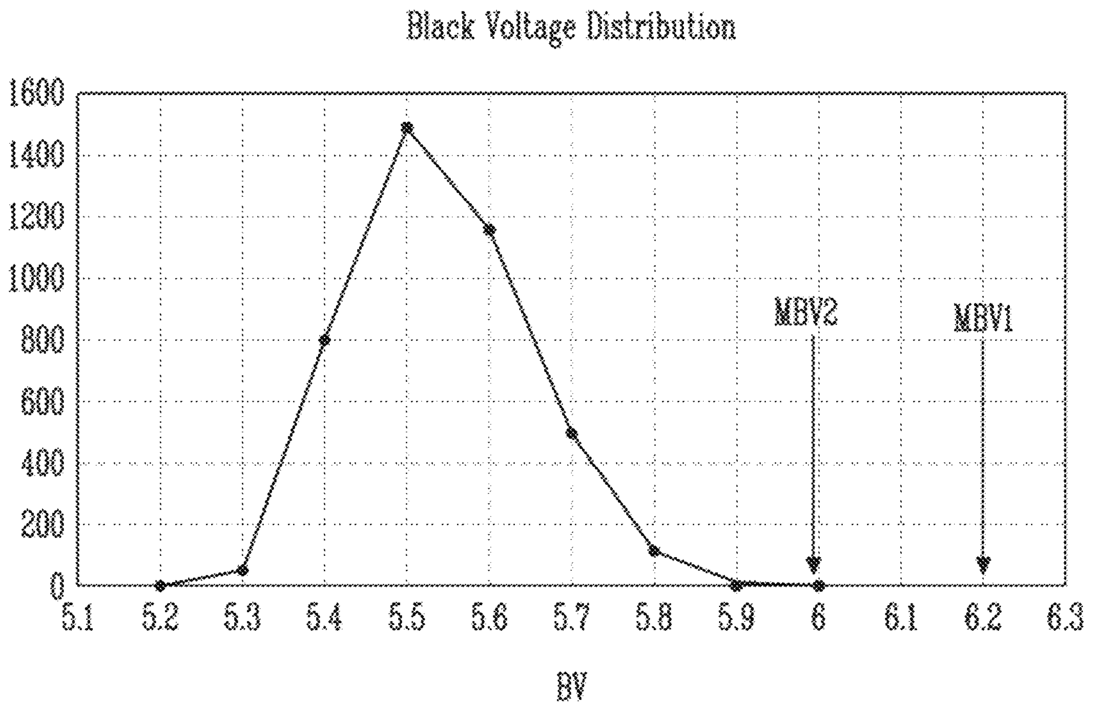
FIG. 6 illustrates another graph of determining a second maximum black voltage in step S220 of FIG. 4.
Figure 7:
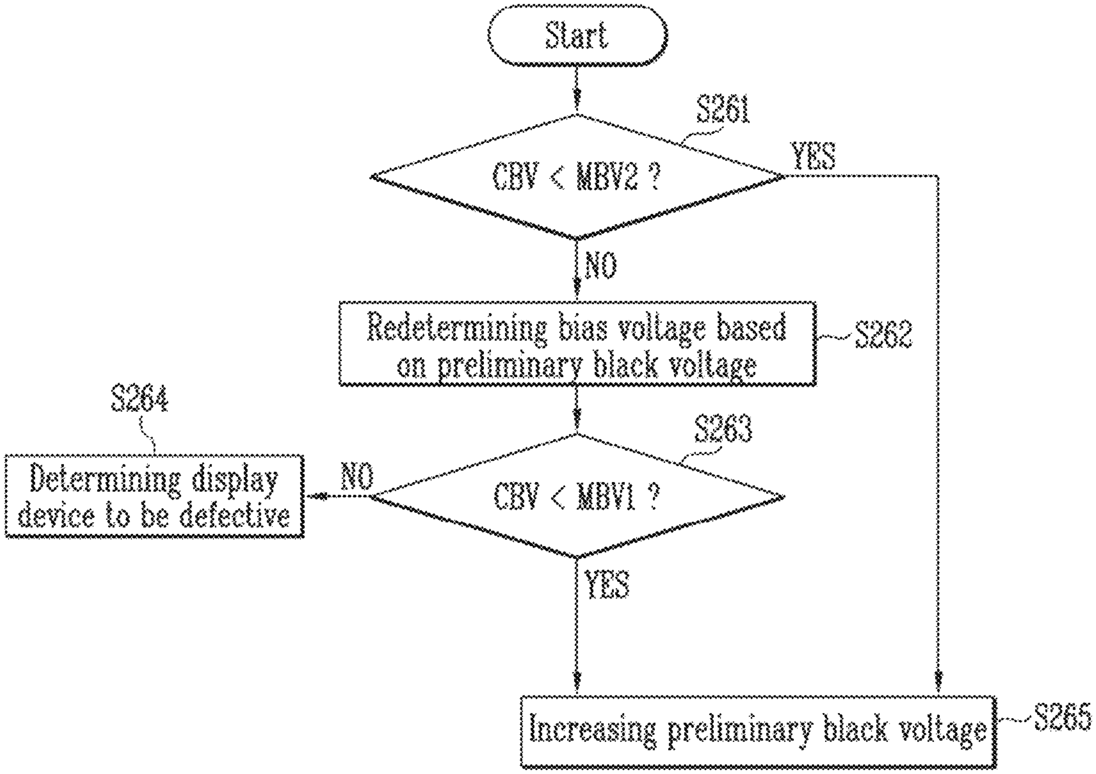
FIG. 7 illustrates a flowchart of step S260 of FIG. 4.

FIG. 4 illustrates a flowchart of step S200 of FIG. 3, FIG. 5 illustrates a graph of determining a second maximum black voltage in step S220 of FIG. 4, FIG. 6 illustrates another graph of determining a second maximum black voltage in step S220 of FIG. 4, and FIG. 7 illustrates a flowchart of step S260 of FIG. 4.

FIG. 5 and FIG. 6 are graphs showing the distribution of black voltage in non-defective display devices.

Referring to FIG. 1 to FIG. 4, the method of driving the display device may include determining a first maximum black voltage through simulation of the pixel P of the display panel 100 (S210), determining a second maximum black voltage that is smaller than the first maximum black voltage (S220), determining a bias voltage based on the second maximum black voltage (S230), measuring luminance of the display panel 100 by applying a preliminary black voltage and a bias voltage VOBS to the pixel P (S240), gradually increasing the preliminary black voltage until the measured luminance ML becomes lower than a reference luminance RL (S250 and S260), and when the measured luminance ML is lower than the reference luminance RL, determining the black voltage based on the preliminary black voltage (S250 and S270). In S240, the reference power voltage ELVSS may be further applied to the pixel P to measure the luminance of the display panel 100.

Specifically, the method of driving the display device may determine the first maximum black voltage through simulation of the pixel P of the display panel 100 (S210). In this embodiment, the first maximum black voltage may be a minimum data voltage at which the current flowing through the first transistor T1 of the pixel P in the simulation is lower than a reference current. For example, the first maximum black voltage corresponds to a data voltage that fully turns off the first transistor T1. The criterion for confirming the complete turn-off of the first transistor T1 is that its leakage current is less than or equal to the reference current.

However, the standard for confirming the complete turn-off of the first transistor T1 in the present invention is not limited to measuring the leakage current. For example, the method for driving the display device may verify the complete turn-off of the first transistor T1 by measuring the luminance of the light emitting element EE in the simulation.

Referring to FIG. 1 to FIG. 6, the method of driving the display device may determine a second maximum black voltage MBV2 that is lower than a first maximum black voltage MBV1 (S220).

Referring to FIG. 2 and FIG. 5, the second maximum black voltage MBV2 can be set arbitrarily by a user among voltages smaller than the first maximum black voltage MBV1. As the second maximum black voltage MBV2 decreases, the bias voltage VOBS also decreases (this will be described in detail later). Lowering the bias voltage VOBS reduces the luminance ML measured for the same preliminary black voltage. Consequently, the power consumption of the display device is reduced, and the difference between the data voltage VDATA of the highest grayscale and the data voltage VDATA of the lowest grayscale (i.e., the black voltage) is reduced. This reduction in the swing of the data voltage VDATA lessens the impact on other components, such as the touch electrode of the touch panel located on the display panel 100 (see FIG. 1).

Referring to FIG. 6, the second maximum black voltage MBV2 may be set as the maximum voltage among the black voltages BV of non-defective display devices. For example, as shown in FIG. 6, when the black voltages BV of the non-defective display devices range between 5.2 V and 6 V, the second maximum black voltage MBV2 may be determined to be 6 V.

Referring to FIG. 1 to FIG. 4, specifically, the method of driving the display device may determine the bias voltage VOBS based on the second maximum black voltage (S230). For example, the bias voltage VOBS can be calculated by adding a preset offset voltage to the second maximum black voltage. For example, if the second maximum black voltage is 5.7 V and the offset voltage is 0.1 V, the bias voltage VOBS may be 5.8 V.

Specifically, the method of driving the display device may measure the luminance of the display panel 100 by applying both the preliminary black voltage and the bias voltage VOBS to the pixel P (S240). For example, the preliminary black voltage may be applied as the data voltage VDATA to the pixel P, while the bias voltage VOBS, determined in step S230, is applied to the pixel P.

Specifically, the method of driving the display device may include gradually increasing the preliminary black voltage until the measured luminance ML falls below the reference luminance RL (S250 and S260). Once the measured luminance ML is lower than the reference luminance RL, the black voltage is determined based on the preliminary black voltage (S250 and S270). An initial value of the preliminary black voltage may be less than the second maximum black voltage. For example, the initial value of the preliminary black voltage might be 4.5 V, and it may be gradually increased by 0.1 V each time the measured luminance ML is lower than the reference luminance RL.

As the data voltage VDATA applied to the pixel P increases, the luminance of the display panel 100 may decrease. In other words, as the preliminary black voltage increases, the measured luminance ML may decrease. In addition, the black voltage may be set so that the display panel 100 emits light at a lower luminance than the black luminance (i.e., the reference luminance RL). Accordingly, the method of driving the display device involves increasing the preliminary black voltage until the measured luminance ML is lower than the black luminance. Once this occurs, the black voltage is determined by adding a preset margin voltage to the preliminary black voltage.

Referring to FIG. 2, FIG. 6, and FIG. 7, in this embodiment, the method of driving the display device may include, when the preliminary black voltage CBV is less than the second maximum black voltage MBV2, increasing the preliminary black voltage CBV (S261 and S265); when the preliminary black voltage CBV is greater than or equal to the second maximum black voltage MBV2, redetermining the bias voltage VOBS based on the preliminary black voltage CBV (S261 and S262); when the preliminary black voltage CBV is greater than or equal to the second maximum black voltage MBV2 and less than the first maximum black voltage MBV1, increasing the preliminary black voltage CBV (S261, S263, and S265); and when the preliminary black voltage CBV is greater than or equal to the first maximum black voltage MBV1, determining the display device to be defective (S263 and S264).

For example, assumed the preliminary black voltage CBV is 4.5 V, the first maximum black voltage MBV1 is 5.9 V, the second maximum black voltage MBV2 is 5.7 V, the offset voltage is 0.1 V, and the measured luminance ML is greater than or equal to the reference luminance RL. In this case, since the preliminary black voltage CBV is less than the second maximum black voltage MBV2, the preliminary black voltage CBV is increased, and the luminance of the display panel 100 is measured again.

For example, assumed the preliminary black voltage CBV is 5.7 V, the first maximum black voltage MBV1 is 5.9 V, the second maximum black voltage MBV2 is 5.7 V, the offset voltage is 0.1 V, and the measured luminance ML is greater than or equal to the reference luminance RL. In this case, since the preliminary black voltage CBV is equal to the second maximum black voltage MBV2, the bias voltage VOBS is redetermined (e.g., recalculated) to be 5.8 V by adding the offset voltage to the preliminary black voltage CBV. Since the preliminary black voltage CBV is less than the first maximum black voltage MBV1, the preliminary black voltage CBV may be increased, and the luminance of the display panel 100 is measured again.

For example, assumed the preliminary black voltage CBV is 5.9 V, the first maximum black voltage MBV1 is 5.9 V, the second maximum black voltage MBV2 is 5.7 V, the offset voltage is 0.1 V, and the measured luminance ML is greater than or equal to the reference luminance RL. In this case, since the preliminary black voltage CBV is greater than the first maximum black voltage MBV1, the display device may be determined to be defective. In FIG. 7, it is shown that the bias voltage VOBS can be recalculated even when the preliminary black voltage CBV is greater than or equal to the first maximum black voltage MBV1, but this is not a limitation of the present disclosure. For example, if the preliminary black voltage CBV is greater than or equal to the first maximum black voltage MBV1, the display device may be determined to be defective without recalculating the bias voltage VOBS.

Figure 8:
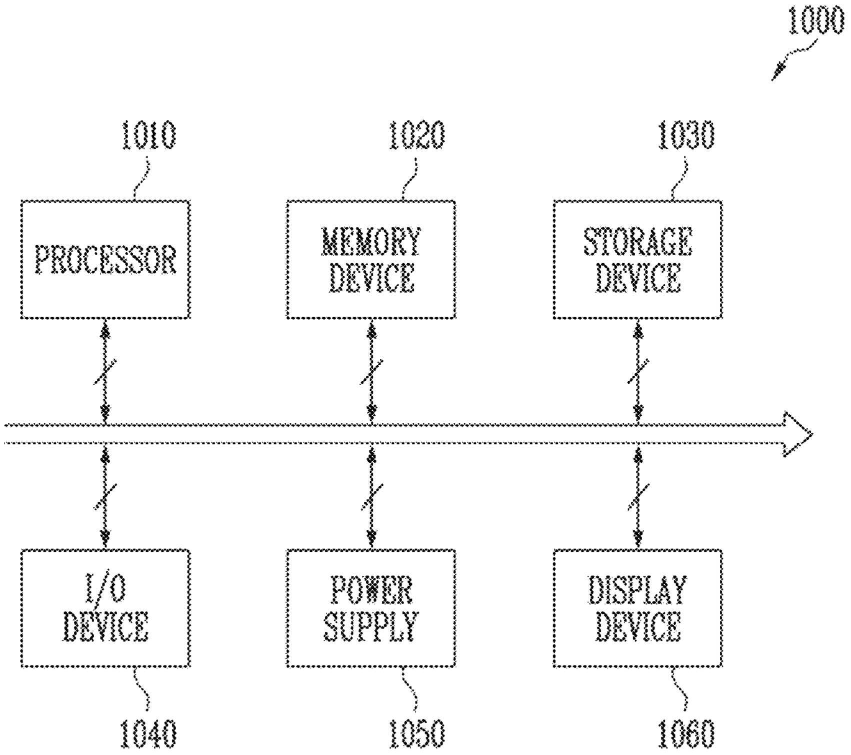
FIG. 8 illustrates a block diagram of an electronic device according to embodiments of the present invention.

FIG. 8 illustrates a block diagram of an electronic device according to embodiments of the present invention.

Referring to FIG. 8, an electronic device 1000 may include a processor 1010, a memory device 1020, a storage device 1030, an input/output device 1040, a power supply 1050, and a display device 1060. In this case, the display device 1060 may be the display device of FIG. 1. In addition, the electronic device 1000 may further include several ports capable of communicating with a video card, a sound card, a memory card, a universal serial bus (USB) device, and the like, or communicating with other systems. In this embodiment, the electronic device 1000 may be implemented as a smart phone. However, this is an example, and the electronic device 1000 is not limited thereto. For example, the electronic device 1000 may be implemented as a mobile phone, a television, a video phone, a smart pad, a smart watch, a tablet personal computer (PC), a vehicle navigation system, a computer monitor, a laptop, a head mounted display device, or the like.

The processor 1010 may perform specific calculations or tasks. In some embodiments, the processor 1010 may be a micro-processor, a central processing unit, an application processor, or the like. The processor 1010 may be connected to other elements through an address bus, a control bus, and a data bus. In some embodiments, the processor 1010 may also be connected to an extension bus such as a peripheral component interconnect (PCI) bus.

The memory device 1020 may store data necessary for operations of the electronic device 1000. For example, the memory device 1020 may include non-volatile memory devices such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PORAM) device, a magnetic random access memory (MRAM) device, and a ferroelectric random access memory (FRAM) device, and/or volatile memory devices such as a dynamic random access memory (DRAM) device, a static random access memory (SRAM) device, and a mobile DRAM device.

The storage device 1030 may include a solid state drive (SSD), a hard disk drive (HDD), a CD-ROM, and the like.

The input/output device 1040 may include input devices such as a keyboard, a keypad, a touch pad, a touchscreen, mouse, and the like, and output devices such as a speaker, a printer, and the like. In some embodiments, the display device 1060 may be included in the input/output device 1040.

The power supply 1050 may supply power necessary for the operation of the electronic device 1000. For example, the power supply 1050 may be a power management integrated circuit (PMIC).

The display device 1060 may display an image corresponding to visual information of the electronic device 1000. In this case, the display device 1060 may be an organic light emitting display device or a quantum dot light emitting display device, but is not limited thereto. The display device 1060 may be connected to other constituent elements through the buses or other communication links.

While certain embodiments and implementations have been described herein, other embodiments and modifications will become apparent from this description.

Accordingly, the invention is not limited to these embodiments, but rather to the broader scope of the appended claims and various modifications and equivalent arrangements that would be apparent to a person of ordinary skill in the art.

The present disclosure may be applied to a display device and an electronic device including the same. For example, the present disclosure may be applied to a digital TV, a three-dimensional (3D) TV, a mobile phone, a smart phone, a tablet computer, a virtual reality (VR) device, a PC, a home electronic device, a laptop computer, a personal digital assistant (PDA), a portable media player (PMP), a digital camera, a music player, a portable game console, a navigation, and the like.

Although the present disclosure has been described with reference to practical embodiments, it should be understood that the invention is not limited to these specific embodiments. Rather, it is intended to encompass various modifications and equivalent arrangements within the spirit and scope of the appended claims.

What is claimed is:

1. A method for setting a black voltage in a display device, comprising:

determining a first maximum black voltage through simulation of a pixel in a display panel;

determining a second maximum black voltage that is less than the first maximum black voltage;

determining a bias voltage based on the second maximum black voltage;

measuring luminance of the display panel by applying a preliminary black voltage and the bias voltage to the pixel;

increasing the preliminary black voltage until the luminance becomes lower than a reference luminance; and when the luminance is lower than the reference luminance, determining a black voltage based on the preliminary black voltage.

2. The method of claim 1, wherein the first maximum black voltage is a minimum data voltage at which a current flowing through a driving transistor of the pixel in the simulation is lower than a reference current.

3. The method of claim 1, wherein the second maximum black voltage is a maximum voltage among black voltages of non-defective display devices.

4. The method of claim 1, wherein the bias voltage is obtained by adding a preset offset voltage to the second maximum black voltage.

5. The method of claim 1, wherein an initial value of the preliminary black voltage is less than the second maximum black voltage.

6. The method of claim 1, wherein the increasing of the preliminary black voltage further includes:

increasing the preliminary black voltage when the preliminary black voltage is less than the second maximum black voltage;

recalculating the bias voltage based on the preliminary black voltage when the preliminary black voltage is greater than or equal to the second maximum black voltage; and increasing the preliminary black voltage when the preliminary black voltage is greater than or equal to the second maximum black voltage and less than the first maximum black voltage.

7. The method of claim 6, wherein the increasing of the preliminary black voltage further includes:

determining the display device to be defective when the preliminary black voltage is greater than or equal to the first maximum black voltage.

8. The method of claim 1, wherein the black voltage is determined by adding a preset margin voltage to the preliminary black voltage.

9. The method of claim 1, wherein the pixel includes:

a first transistor for generating a driving current;

a second transistor for providing a data voltage to the first transistor in response to a write gate signal;

a third transistor for diode-connecting the first transistor in response to a compensation gate signal;

a storage capacitor connected to a control electrode of the first transistor; and a light emitting element electrically connected to the first transistor.

10. The method of claim 9, wherein the first transistor is a p-channel metal oxide semiconductor (PMOS) transistor.

11. A method for driving a display device, comprising:

determining a reference power voltage;

determining a black voltage; and determining grayscale voltages based on the black voltage, wherein the determining of the black voltage includes:

determining a first maximum black voltage through simulation of a pixel in a display panel;

determining a second maximum black voltage that is less than the first maximum black voltage;

determining a bias voltage based on the second maximum black voltage;

measuring luminance of the display panel by applying a preliminary black voltage, the bias voltage, and the reference power voltage to the pixel;

increasing the preliminary black voltage until the luminance becomes lower than a reference luminance; and when the luminance is lower than the reference luminance, determining a black voltage based on the preliminary black voltage.

12. The method of claim 11, wherein the first maximum black voltage is a minimum data voltage that allows a current flowing through a driving transistor of the pixel in the simulation to be lower than a reference current.

13. The method of claim 11, wherein the second maximum black voltage is a maximum voltage among black voltages of non-defective display devices.

14. The method of claim 11, wherein the bias voltage is obtained by adding a preset offset voltage to the second maximum black voltage.

15. The method of claim 11, wherein an initial value of the preliminary black voltage is less than the second maximum black voltage.

16. The method of claim 11, wherein the increasing of the preliminary black voltage further includes:

increasing the preliminary black voltage when the preliminary black voltage is less than the second maximum black voltage;

recalculating the bias voltage based on the preliminary black voltage when the preliminary black voltage is greater than or equal to the second maximum black voltage; and increasing the preliminary black voltage when the preliminary black voltage is greater than or equal to the second maximum black voltage and less than the first maximum black voltage.

17. The method of claim 16, wherein the increasing of the preliminary black voltage further includes:

determining the display device to be defective when the preliminary black voltage is greater than or equal to the first maximum black voltage.

18. The method of claim 11, wherein the black voltage is determined by adding a preset margin voltage to the preliminary black voltage.

19. The method of claim 11, wherein the pixel includes:

a first transistor for generating a driving current;

a second transistor for providing a data voltage to the first transistor in response to a write gate signal;

a third transistor for diode-connecting the first transistor in response to a compensation gate signal;

a storage capacitor connected to a control electrode of the first transistor; and a light emitting element electrically connected to the first transistor.

20. The method of claim 19, wherein the driving transistor is a p-channel metal oxide semiconductor (PMOS) transistor.

* * * * *